A. O. FEILBACH.
SEAT SUPPORT FOR MOTOR CYCLES.
APPLICATION FILED OCT. 24, 1912.
1,102,255.
Patented July 7, 1914.
2 SHEETS—SHEET 2.
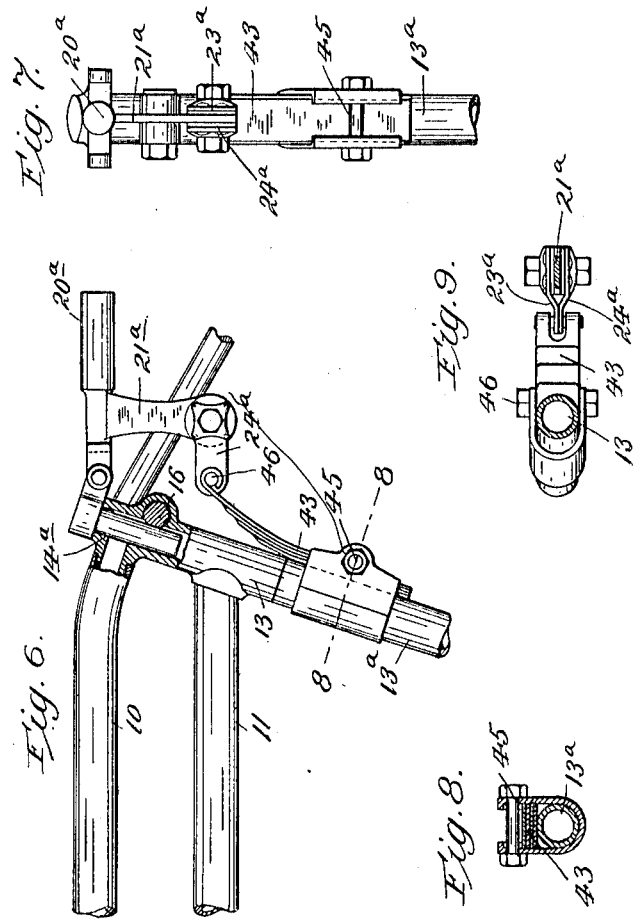
WITNESSES:
INVENTOR
Arthur O. Feilbach,
BY
ATTORNEYS.

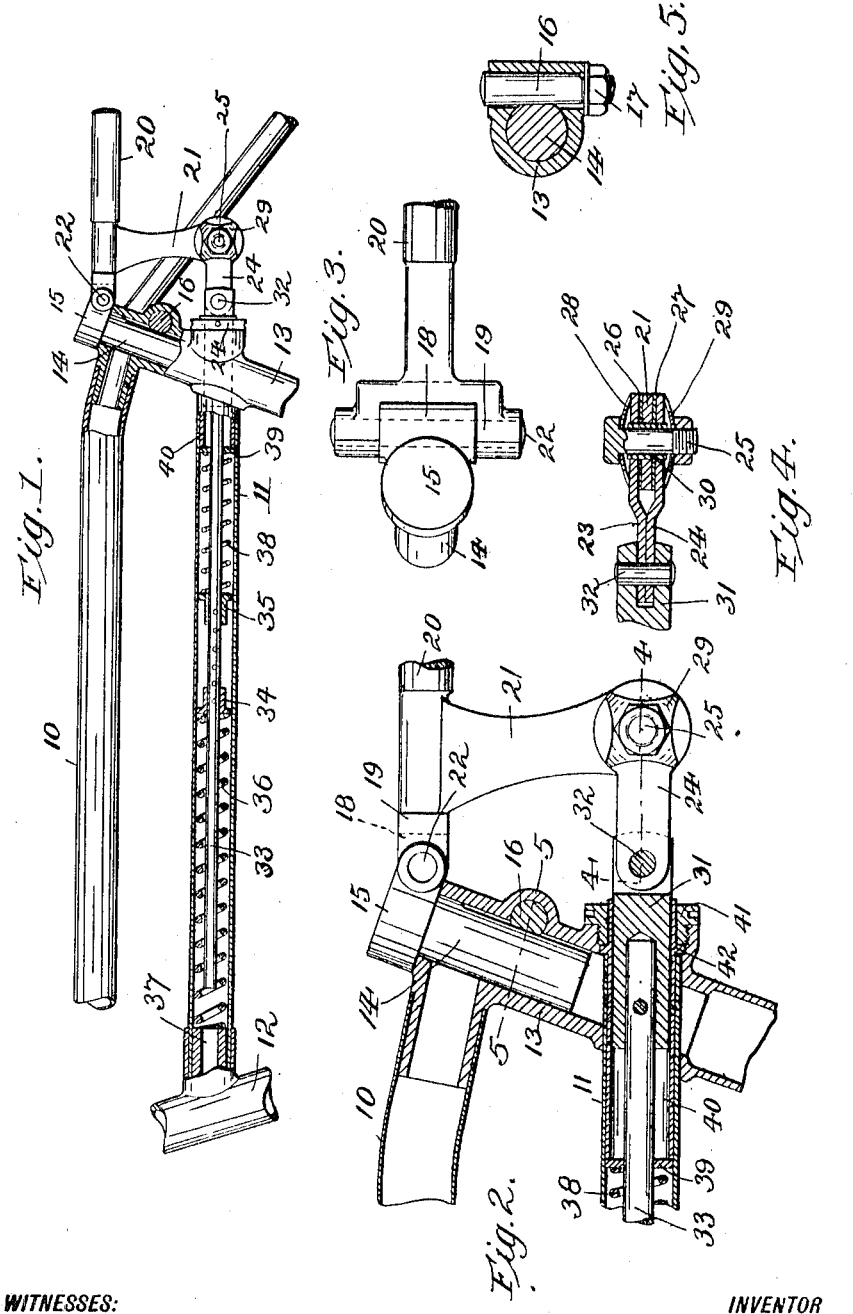

UNITED STATES PATENT OFFICE.

ARTHUR O. FEILBACH, OF NORTH MILWAUKEE, WISCONSIN, ASSIGNOR TO FEILBACH MOTOR COMPANY, OF MILWAUKEE, WISCONSIN, A CORPORATION OF WISCONSIN.

SEAT-SUPPORT FOR MOTOR-CYCLES.

1,102,255.        Specification of Letters Patent.      Patented July 7, 1914.

Application filed October 24, 1912. Serial No. 727,550.

*To all whom it may concern:*

Be it known that I, ARTHUR O. FEILBACH, a citizen of the United States, residing at North Milwaukee, in the county of Milwaukee and State of Wisconsin, have invented certain new and useful Improvements in Seat-Supports for Motor-Cycles, of which the following is a specification.

My present invention pertains to improvements in seat-supports designed more especially for use in connection with motor cycles.

The invention is illustrated in two forms in the annexed drawings, in which:

Figure 1 is a sectional elevation of a portion of a vehicle frame, showing my invention applied thereto; Fig. 2 an enlarged sectional view of a portion of the structure; Fig. 3 a top plan view of the parts shown in Fig. 2; Fig. 4 a horizontal sectional view, taken on the line 4—4 of Fig. 2; Fig. 5 a horizontal sectional view, taken on the line 5—5 of Fig. 2; Fig. 6 a sectional elevation of a modified form of the structure; Fig. 7 a rear elevation thereof; Fig. 8 a transverse sectional view, taken on the line 8—8 of Fig. 6; and Fig. 9 a similar view taken on the line 9—9 of Fig. 6.

The main object of the invention is to provide a seat-support which will, in a great measure, absorb the shock incident to the passage of the machine over an obstruction or through a rut or the like, and prevent the transmission thereof to the rider, the mechanism likewise being such as to prevent undue play or rebound of the parts.

The preferred form of the invention is illustrated in Figs. 1 to 5 inclusive, which will first be described. In said figures, 10 and 11 indicate the upper and lower reach members of the frame, which are preferably tubular in form and connected, as usual, at their forward ends by a tubular member 12, and at their rear by a tubular member 13, such members being of the ordinary construction and formation. The upper end of the member 13 is open and a post 14, provided with a head 15, is mounted therein, said post upon its rear face being flattened and adapted to coact with a pin 16, the forward face of which is made flat and tapering and adapted to coact with the flattened face of the post to secure the latter in its adjusted position in the tubular member 13. By screwing up the nut 17 mounted upon the pin, the post 14 will be forced forwardly and into intimate and locking contact with the tubular member 13. The head 15 is provided with a rearward extension 18, which passes into a bifurcated head 19 formed as a forwardly-projecting portion of the elbow-lever, comprising the seat-supporting member 20 and the depending arm or member 21. A pin 22, passing through the bifurcated head 19 and through the rearward extension 18, forms a hinge connection between the post and the elbow-lever, upon the member 20 of which the seat or saddle is designed to be secured. Pivotally secured to the lower end of the arm 21 are two links 23 and 24, a bolt 25 passing through the enlarged heads formed upon said links and also through fiber washers 26 and 27 and spring washers 28 and 29, which bear upon the outer faces of the heads of the links 23 and 24. Preferably a tube or sleeve 30 will encircle the bolt 25 and, as shown in Fig. 4, will be of such length as to pass through the heads of the links and also through the washers 26, 27 and the embraced lower end of the arm 21. The links at the forward end are brought together and pass into a slot formed in a sliding block or plunger 31, being pivotally connected thereto through a pin 32. Said plunger is secured to a rod or bar 33, which extends forwardly and substantially throughout the length of the lower tubular reach member 11. Said rod carries blocks 34 and 35, adjustably secured thereto so that they may be moved toward and from one or the other end of said rod. A relatively heavy spring 36 is positioned between the forward face of the block 34 and the inner end of a fixed sleeve or abutment 37, secured in the reach member 11 adjacent to the tubular member 12. Said spring 36 is designed to absorb the shock and is of such strength as to normally hold the seat-supporting member 20 in a substantially horizontal position. A second spring 38 coacts with the block 35, being positioned between said block and a washer 39 held against the opposite end of the spring by a sleeve 40, said sleeve being held in the rear end of the reach member 11 by a nut 41, which is screwed into the frame of the machine adjacent to the rear end of the reach member 11. Said nut, as will be seen upon reference to Fig. 2, bears upon a collar or enlargement 42 formed upon the sleeve 40. The spring 38 is designed to prevent rebound, and works in opposition to the spring 36. By adjusting the blocks 34 and 35 along the rod 33 the springs may be put under greater or less compression and the seat-support adjusted with reference to the weight of the rider.

It is thought that the operation of the mechanism will be clear from the foregoing description, it being understood that when the machine passes over an obstruction or through a depression or the like which imparts a jar thereto, the elbow lever, acting through the knuckle-joint connection formed by the link 24, will force the rod 33 forwardly and place the spring 36 under compression, thus relieving the rider from the jar or impact which would otherwise be imparted to him. Overthrow or rebound of the parts, owing to the elongation of the spring after the obstruction has been passed, will be prevented to a greater or less extent by the spring 38 and likewise by the fiber and spring washers placed in the joint between the lower end of the elbow-lever and the links which form a connection between said lever and the spring mechanism.

In Figs. 6 to 9 inclusive a modification of the invention is illustrated. The frame construction is substantially the same and the elbow-lever forming the seat-support is likewise employed. The post 14$^a$ has pivoted thereto in a manner similar to that before described, the elbow-lever comprising the seat-supporting member 20$^a$ and the depending arm 21$^a$. The links, in this instance indicated by 23$^a$ and 24$^a$, are somewhat shorter and are preferably connected to the depending arm through the spring and fiber washer connection hereinbefore described. A leaf spring 43 is secured to the rear face of the frame member 13$^a$ by a U-shaped clamp which embraces the frame member and is held in its adjusted position thereon and with reference to the spring 43 by a bolt 45 which passes through the wings of the clamp and securely binds the parts together. The upper end of the leaf spring is pivotally connected to the links 23$^a$, 24$^a$ by means of a through pin or bolt 46. By adjusting the clamp up and down upon the frame member 13$^a$ and the spring 43, the effective length of the spring may be shortened or lengthened and thus adjusted to accommodate itself to the weight of the rider. The downward movement of the seat-supporting member 20$^a$ will tend to put the spring under compression and thus relieve the rider from shock as the machine passes over an obstruction. The rebound will likewise be taken care of by said spring to a greater or less extent and undue vibration or overthrow of the parts will be prevented through the utilization of spring and fiber washers employed in connection with the links and the lower end of the elbow lever.

Having thus described my invention, what I claim is:

1. In a seat-support for motor vehicles and the like, the combination of a vehicle frame; an elbow-lever pivotally supported with reference to the frame at substantially the junction of the arms of said lever and having one arm rearwardly and horizontally disposed and adapted to support a saddle, the other arm extending downwardly; a buffer spring carried by the frame; and connections between the lower end of the downwardly-extending arm and said spring.

2. In a seat-support for motor vehicles and the like, the combination of a vehicle frame; an elbow-lever pivotally supported with reference to the frame at substantially the junction of the arms of said lever and having one arm horizontally disposed and adapted to support a saddle, the other arm extending downwardly; a buffer spring carried by the frame; and connections, involving a friction mechanism, between the lower end of the depending arm and the spring.

3. In a seat-support for motor vehicles and the like, the combination of a vehicle frame; a post secured thereto; an elbow-lever pivotally connected at substantially the junction of its arms to said post, with one arm thereof standing in a substantially horizontal position and the other extending downwardly; a buffer spring carried by the frame; and a link connection between said spring and the lower end of the depending arm of the elbow-lever.

4. In a seat-support for motor vehicles and the like, the combination of a vehicle frame, involving a horizontally-disposed tubular reach member; an elbow-lever pivotally supported with reference to the frame at substantially the junction of the arms of said lever and having one arm lying in a substantially horizontal plane, with the other arm extending downwardly; a buffer spring mounted in the tubular reach member; and connections between said spring and the downwardly-extending arm.

5. In a seat-support for motor vehicles and the like, the combination of a vehicle frame, involving a horizontally-disposed tubular reach member; an elbow-lever pivotally supported with reference to the frame at substantially the junction of the arms of said lever and having one arm lying in a substantially horizontal plane, with the other arm extending downwardly; a buffer spring mounted in the tubular reach member; and connections, involving a friction mechanism, between said depending arm and the spring.

6. In a seat-support for motor vehicles and the like, the combination of a vehicle frame, involving a horizontally-disposed tubular reach member; an elbow-lever pivotally supported with reference to the frame at substantially the junction of the arms of said lever and having one arm, adapted to support a seat, lying in a substantially horizontal plane, while the other extends downwardly; a spring mounted in the tubular reach member; a link pivotally connected to the lower arm of the elbow-lever; and a rod extending forwardly from said link and adapted to coact with the spring.

7. In a seat-support for motor vehicles and the like, the combination of a vehicle frame, involving a horizontally-disposed tubular reach member; an elbow-lever pivotally supported with reference to the frame at substantially the junction of the arms of said lever and having one arm, adapted to support a seat, lying in a substantially horizontal plane, while the other extends downwardly; a spring mounted in the tubular reach member; a rod also mounted in said member; a block adjustably secured upon said rod and adapted to coact with the spring; and a link connection between the outer end of said rod and the lower end of said downwardly-extending arm.

8. In a seat-support for motor vehicles and the like, the combination of a vehicle frame, involving a horizontally-disposed tubular reach member and a substantially vertical member having a post-receiving socket therein; a post mounted in said socket; means for securing the same in position therein; an elbow-lever fulcrumed to the upper end of said post, one arm of said lever lying in a substantially horizontal plane and adapted to receive a seat, and the other arm extending downwardly; a link pivotally connected to the lower end of said arm; a friction device working in conjunction with the pivotal connection between said parts; a rod extending forwardly from said link into the tubular reach member; a pair of blocks adjustably secured upon said rod; a spring mounted in the forward portion of said tubular member, adapted to coact with the forward block; a second spring located in the rear portion of said tubular member and adapted to coöperate with the rear block; and a fixed abutment mounted in the tubular reach member, adapted to coact with the rear end of the last-mentioned spring.

In testimony whereof I have signed my name to this specification in the presence of two subscribing witnesses.

ARTHUR O. FEILBACH.

Witnesses:
J. F. JACKSON,
WM. HINRICHS.

---

Copies of this patent may be obtained for five cents each, by addressing the "Commissioner of Patents, Washington, D. C."